United States Patent [19]

Thomas

[11] 4,116,540

[45] Sep. 26, 1978

[54] NON-PERVERTING MIRROR

[76] Inventor: David E. Thomas, 3205 Alcazar NE., Albuquerque, N. Mex. 87110

[21] Appl. No.: 700,051

[22] Filed: Jun. 25, 1976

[51] Int. Cl.² .............................................. G02B 5/10
[52] U.S. Cl. ................................... 350/293; 350/297
[58] Field of Search ............... 350/191, 288, 293–297; 272/8 M, 13

[56] References Cited

U.S. PATENT DOCUMENTS 3,255,453  6/1966  Horst ............................. 350/191 X 4,035,064  7/1977  Cowman, Jr. et al. ............... 350/293

OTHER PUBLICATIONS

Burwell, RCA Technical Notes, TN No. 774, Sep. 1968, pp. 1–3.

*Primary Examiner*—F. L. Evans
*Attorney, Agent, or Firm*—Bacon & Thomas

[57] ABSTRACT

A mirror for providing non-perverted images of an object comprising a reflecting surface having a concave and convex intersecting region such as that formed by an inner section of a torus.

20 Claims, 24 Drawing Figures

ARC OF CIRCLE OF RADIUS (a) (CONVEX)

ARC OF CIRCLE OF RADIUS (b) (CONCAVE)

Fig. 5A.

HORIZONTAL PLANE (CONCAVE)

VERTICAL PLANE (CONVEX)

R IS NEGATIVE

R IS POSITIVE

NON-PERVERTING MIRROR

BACKGROUND OF THE INVENTION

1. Field of the Invention

The invention is in the field of non-perverting single surface reflecting mirrors.

2. Description of the Prior Art

Most mirrors used today such as plane, convex, concave and parabolic mirrors give perverted images i.e., the image of a right hand is a left hand, images of words are backwards, and so forth. It is possible to obtain non-perverted images by utilizing two plane mirrors at right angles to effect a double reflection. Two successive image-perversions combine to produce a non-perverted image. An example of such a technique is shown in U.S. Pat. No. 1,991,054 to Hampke.

A non-perverted image may also be formed with a concave cylindrical mirror. Such a cylindrical mirror consists of a single reflecting surface and is referred to in classic literature of Plato and Lucretius, and is described in modern works such as *Mathematical Puzzles and Diversions*, by Martin Gardner, Simon and Schuster, New York (1959).

It is desirable to provide a non-perverted single surface mirror which gives a true image of the object under observation. The disadvantage of the prior art non-perverted concave cylindrical surface is the large image distortion present resulting from elongation of the image in the direction of the cylindrical axis. An additional problem with the concave cylindrical mirror is its poor image focusing ability inasmuch as cylindrical rather than spherical wavefronts are generated.

SUMMARY OF THE INVENTION

It is an object of the invention to provide a non-perverting mirror which is free from the disadvantages of the prior art and which comprises a single, continuous reflecting surface.

Yet another object of the invention is to provide a single surface non-perverting mirror which provides a substantially non-distorted image of the object under observation.

A further object of the invention is to provide a single surface non-perverting mirror which reflects substantially spherical reflected wavefronts to provide an image which may be sharply focused.

Another object of the invention is to provide a non-perverting mirror having a number of saddle points to provide non-perverted images having advantageous rotation properties upon rotation of the mirror and/or object.

The mirror of the instant invention thus provides non-perverted images of objects and comprises a light reflecting surface having at least one intersecting concave and convex region. The intersecting regions define a surface region of the mirror which has spacially coincident concave and convex curvatures. In the preferred embodiment of the invention the direction of concave curvature is substantially orthogonal to the direction of convex curvature.

The mirror may be used as a novelty device or in optical instruments where a non-perverting image is desired. Means for rotating the non-perverting mirrors may also be provided to take advantage of the image rotation properties of the mirror so that large image rotations are achieved with only a small corresponding mirror rotation.

BRIEF DESCRIPTION OF THE DRAWINGS

These and other objects and advantages of the invention will become clear from the following detailed description taken in conjunction with the drawings wherein.

DETAILED DESCRIPTION OF THE PREFERRED EMBODIMENT

Before proceeding to an analysis of non-perverted images it is helpful to set forth some observations regarding plane, concave and convex mirrors and the perverted images formed thereby.

For a plane mirror, reflected wavefronts appear to come from a point as far behind the mirror as the object being viewed is in front of the mirror. For an extended object, the image can be calculated point by point. For example, when two objects on either side of an observer are considered, the image of the object on the right side is seen to the right in the mirror, and the image of the object on the left side is seen to the left. The same thing happens when objects above and below the mirror are considered: the image of the upper object is seen above the image of the lower object. Thus, in the case of a vertical mirror in an east-west plane, when an object moves to the east (west) the image moves to the east (west) and similarly, when an object moves up (down) the image moves up (down). What is "reversed" in a plane mirror is forwards and backwards. An observer and his image face each other. Thus, if an object moves to the north, his image moves to the south. The perversion of the image is a direct consequence of the forward-backward reversal; vertical and lateral directions are not reversed. Any object can be oriented in space by specifying three directions pertaining to the object: forward and backward, left and right, and up and down. If an odd number of these directions are reversed by an optical device, the resulting image is perverted. A plane mirror, having only a single (forward-backward) reversal thus produces a perverted image.

For a convex mirror, the reflected wavefronts are spheres of greater curvature (thus smaller radius) than the original incident wavefronts. The image appears to come from a point closer to the mirror than the corresponding object is, and so everything appears smaller in a convex mirror. For two objects to the right and left of an observer, the respective images are also to the right and left, just as in a plane mirror. The convex mirror reverses only forward and backward and so produces perverted images.

The concave mirror is more complicated, because for different object and/or viewer positions, the images might appear to come from in front of or in back of the mirror. For an object inside the focus (a distance equal to half the radius of a spherical mirror) the image appears to come from behind the mirror, and is erect (lateral and vertical directions are not reversed). For an object outside the focus, the image appears to come from in front of the mirror, and is inverted (both lateral and vertical directions are reversed). In both cases, forward and backward are reversed, as with all mirrors. The number of reversals for erect images is one, and for inverted images is three. Thus, since there is always an odd number of reversals, all images in concave mirrors are perverted.

Figures 1A, 1B, 2A:
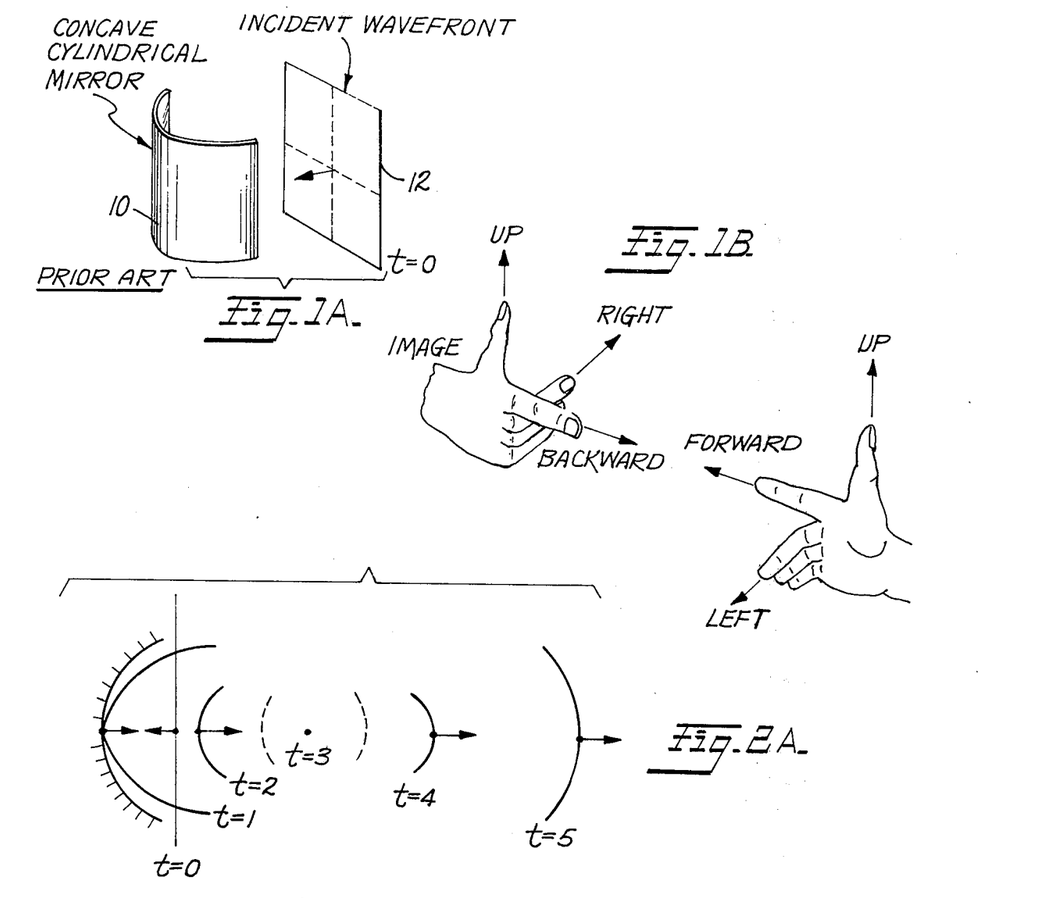
FIG. 1A is a perspective view of a prior art concave cylindrical reflecting surface.
FIG. 1B is a diagramatic representation of a non-perverting image such as produced by the reflecting surface of FIG. 1A.
FIGS. 2A–2C are diagramatic representations of reflecting wavefronts from the concave cylindrical surface of FIG. 1.

The simplest non-perverting single-reflection mirror has a concave cylinder surface such as shown by mirror 10 in FIG. 1A. The mirror is flat in one direction (vertical), and curved toward the observer in a direction perpendicular to the first direction (horizontal). Images in mirror 10 can be predicted quite well by considering mirror 10 as a combination of two mirrors, one of which is horizontal and the other vertical. Image formation horizontally is calculated by considering the horizontal mirror curvature; vertical image formation is found by using the vertical mirror curvature. The results are then combined to find the type of image formed. This method works for any smooth mirror with similar vertical curvature everywhere on the mirror, and also a similar horizontal curvature. Horizontal and vertical curvatures need not be the same.

For an object that is outside the focus of mirror 10, horizontal image formation will be similar to that in a concave mirror: right and left are inverted. However, vertical image formation will be similar to that for a plane mirror: up and down are not inverted. Forward and backward are reversed, as for all mirrors, and so the total number of reversals is two (forward-backward and right-left). As a result of the even number of reversals, the image is not perverted. The relationship of an object to its image in a non-perverting mirror is shown in FIG. 1B. It is noted that the non-perverted image of a "right-hand" is a "right-hand".

When the mirror 10 is rotated by 90 degrees relative to the orientation shown in FIG. 1A, the curvature is vertical, and the analysis is similar. Right and left are not reversed (as in a plane mirror), whereas up and down are reversed (as in a concave mirror). The number of reversals is still two, so the image is non-perverted, but it appears upside down.

In the concave-cylindrical mirror, two different directions are reversed to produce a non-perverted image. When two separate plane mirrors are used, non-perverted images are seen as well. However, this is the result of two successive inversions of the same direction (forward-backward), and is thus fundamentally different from the image formation in concave-cylindrical mirrors in that two separate reflections are required.

Figures 2B, 2C:
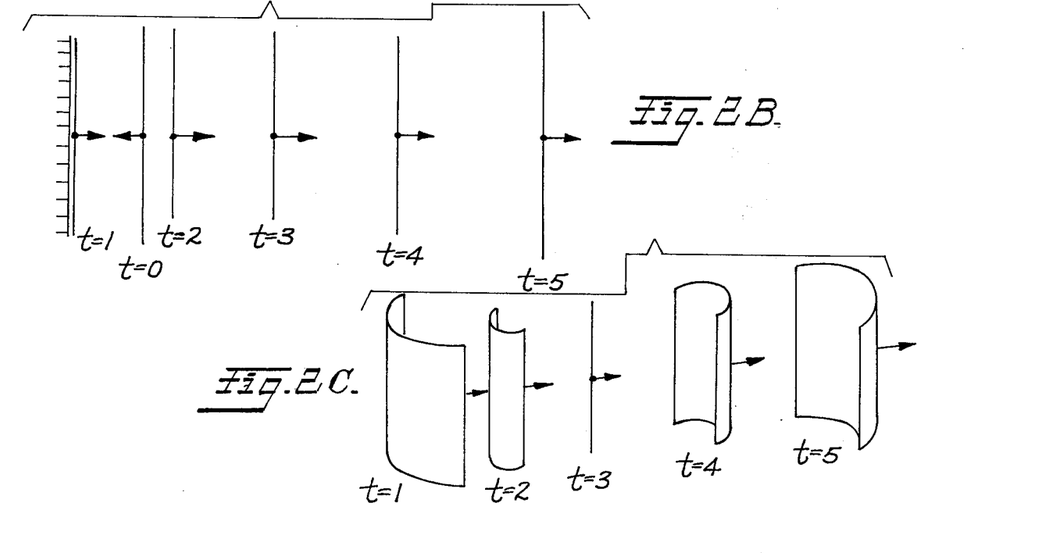

Any point object emits or reflects spherical wavefronts. The human eye is adapted for spherical wavefronts, and cannot properly focus wavefronts that are highly non-spherical. The wavefronts reflected from plane, convex and concave mirrors are spherical, although of differing curvatures. Thus, these waves can be easily focused by the eye. However, the wavefronts reflected from the concave-cylindrical mirror 10 are not spherical. Consider a nearly flat wavefront (from a distant object) that has just reached the surface of a concave-cylindrical mirror, as indicated by 12 in FIG. 1A. The reflected wavefronts are shown at successive time intervals after reflection in FIGS. 2A-2C. FIG. 2A shows what happens in the horizontal plane (parallel to the curvature) and is very similar to the case for a concave mirror. FIG. 2B shows what happens in a vertical plane (along the flat direction of the cylinder), and is similar to the case for a plane mirror. The combined three-dimensional wavefronts are depicted in FIG. 2C for the same time intervals. The waves converge on a line at $t = t_3$ (not a point as in the case for spherical concave mirrors), and then assume the shape of an expanding cylinder. In order to receive waves of the same horizontal and vertical curvature (i.e., spherical waves), the viewer must stand at a distance far away from the mirror for the expanding cylindrical wavefront to assume a virtually flat shape. A viewer closer than this distance will see waves of different vertical and horizontal curvatures, and will not be able to focus well. Poor focusing of images is one major flaw of the concave-cylindrical mirror of the prior art.

Another major drawback of the concave-cylindrical mirror 10 is that it provides elongated images. The amount of elongation increases as one gets farther from the mirror. For example, if the concave radius of curvature is labeled R, then an observer looking at himself in concave-cylindrical mirror 10 while standing a distance of 4R from the mirror will see a non-perverted image three times as tall as it is wide, in relation to the original object. At a distance of 3R, the image is twice as tall as it is wide; and at a distance of 2R, the image is just as tall as it is wide. It is evident that the two major disadvantages of the concave-cylindrical mirror 10 are important in different areas. A person close to the mirror will see a relatively non-elongated image, but will not be able to focus the wave-fronts properly because they are more asymmetrical for viewers close to the mirror. On the other hand, when the viewer is sufficiently far from the mirror so that image focus is acceptable the image is extremely elongated.

Figure 3:
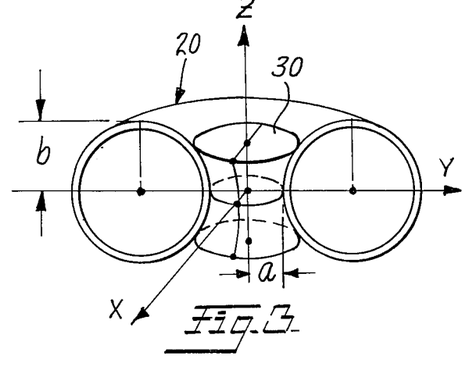
FIG. 3 is a partial view of a torus showing a segment thereof forming the toroidal surface of the invention.
Figure 4:
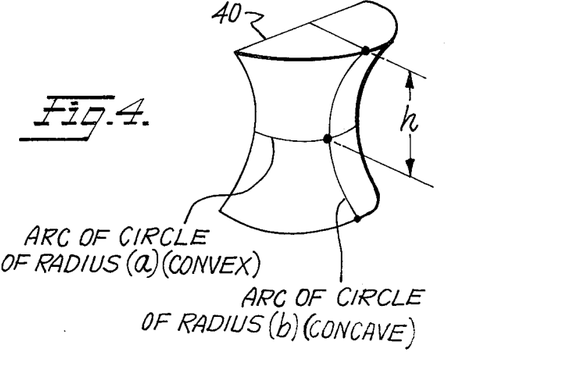
FIG. 4 is an enlarged view of a torodial mirror in accordance with the invention.

One embodiment of a single-reflection non-perverting mirror of the instant invention is shown in FIGS. 3 and 4. FIG. 3 illustrates a portion of a torus 20 which is centered about X-Y-Z coordinate axes. The torus defines an inner solid indicated at 30, which when cut in two or more sections (along the Z direction) forms the mirror 40 shown enlarged in FIG. 4. The surface of mirror 40 thus conforms to the inside surface of torus 20.

The equation for the torus is:

$$\left( \sqrt{x^2 + y^2} \right) = (a + b) \pm \sqrt{b^2 - z^2}$$

For the portion of the torus actually used for the non-perverting mirror, the equation is:

$$\sqrt{x^2 + y^2} = (a + b) - \sqrt{b^2 - z^2} \quad\quad 5$$

Where $-h < z < +h$.

The above restrictions confine the shape of mirror 40 to an inner, "apple core" shaped portion of the torus. The distance b will be called the concave radius $R_E$ of the mirror, because the mirror's concave curvature in the vertical direction is the same as that of a concave spherical mirror of radius b. Similarly, the distance a will be called the convex radius $R_X$ of the mirror, and denotes the curvature in the horizontal direction. There will be no double reflections on the edges of the mirror provided that $$h \leq \frac{R_E}{\sqrt{2}} \text{ (or } h \leq \frac{b}{\sqrt{2}} \text{)}.$$

This criterion is used because a viewer at an infinite distance will see double reflections if $h < R_E/\sqrt{2}$; when the mirror is made so that $h = R_E/\sqrt{2}$, the viewer at an infinite distance will just be able to see double reflections, but closer viewers will not see any double reflections.

Figures 5A, 5B:
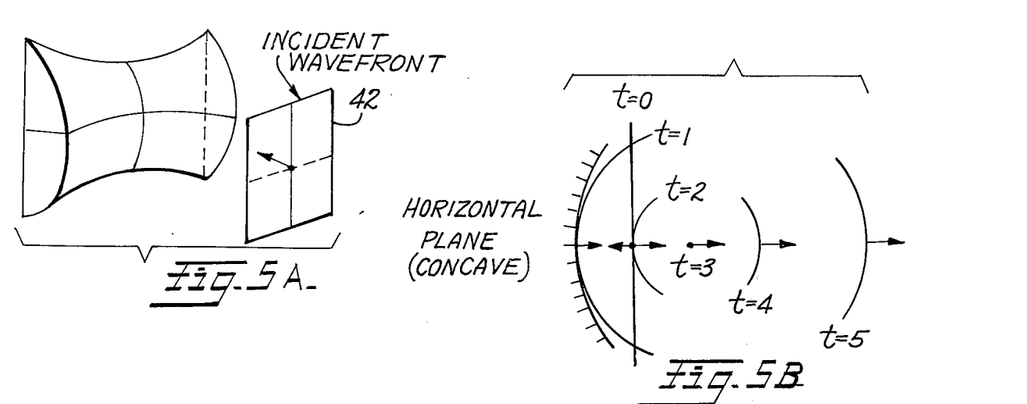
FIGS. 5A–5D are diagramatic representations of reflecting wavefronts from the toroidal mirror of the invention.
Figure 5C:
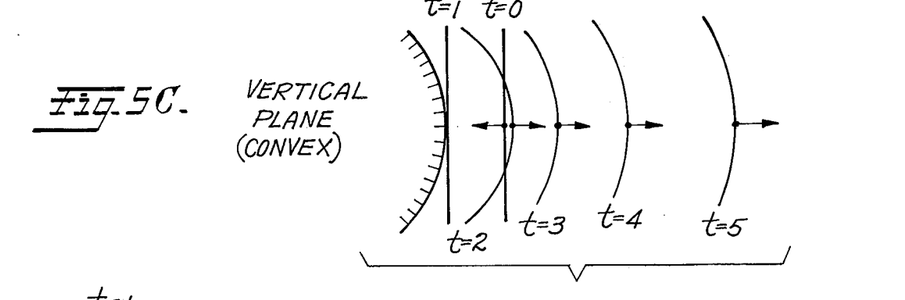
Figure 5D:
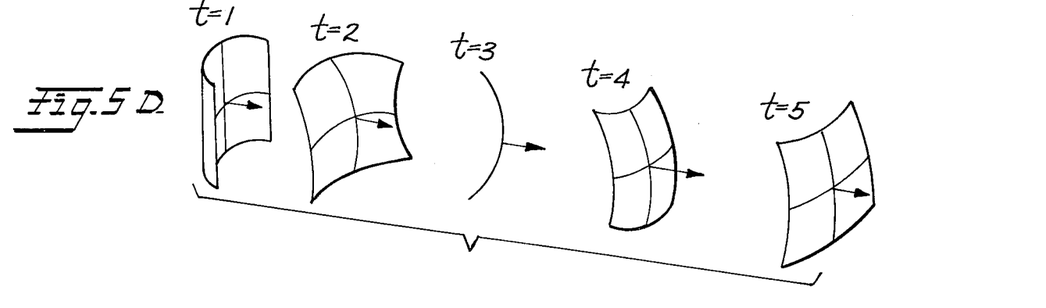

In general, the wavefronts reflected from a torodial mirror assume a nearly spherical shape closer to the mirror than do the wavefronts from a concave-cylindrical mirror. FIG. 5A shows a nearly flat wavefront 42 approaching the surface of toroidal mirror 40. (Mirror 40 is shown rotated 90° relative to the orientation of FIG. 4.) The reflected wavefronts are shown at successive intervals in FIGS. 5B–5D. FIG. 5B shows what happens in a horizontal plane, and is similar for the case for a concave mirror. FIG. 5C shows what happens in a vertical plane, and is similar to the case of a convex mirror. The combined three-dimensional wavefronts are pictured in FIG. 5D for the same time intervals. The waves converge to a convex curve (not a straight line, as was the case for a concave-cylindrical mirror). The wavefronts then expand to the shape of an outside section of a torus. Although the reflected wavefront is curved differently in vertical and horizontal directions, the difference in curvatures is much smaller than would be the case for a concave-cylindrical mirror. Thus, the wavefronts assume a nearly spherical shape much closer to the toroidal mirror 40 than for the concave-cylinderical mirror 10. A viewer can resolve images at a distance closer to the toroidal mirror 40 than he could for the concave-cylindrical mirror 10.

The concave-cylindrical mirror 10 has another distinct disadvantage, elongation of images, which also is reduced considerably in the toroidal mirror 40. One may best illustrate image elongation mathematically. In the following equations, the distance to the viewer's eye from the vertex (center) of the mirror is called E; the object-vertex distance is called P; and the mirror's radius is called R. R is negative for convex mirrors, positive for concave mirrors, and equal to infinity for plane mirrors. For an object of height D, the angular size of the image ($\theta$) is given by the relation $$\tan \theta = D / \left( P + E - \left( \frac{2PE}{R} \right) \right) \quad\quad (2)$$

Figure 6A:
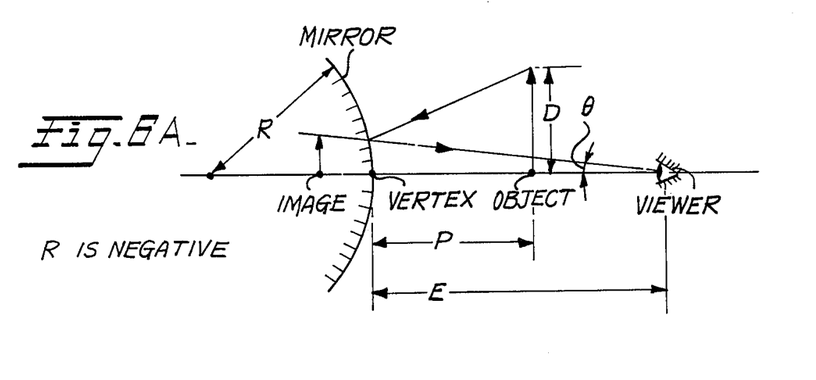
FIGS. 6A–6C are diagramatic representations of ray diagrams for convex, planar and concave surfaces respectively.
Figure 6B:
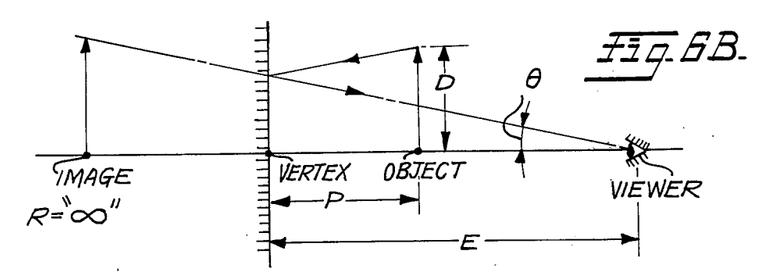
Figure 6C:
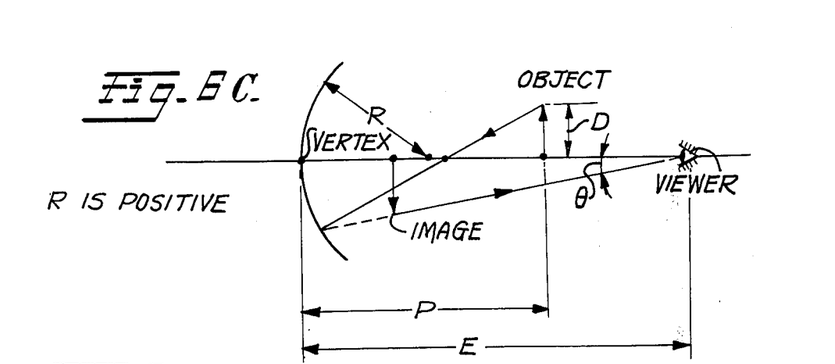

FIGS. 6A–6C show the angle $\theta$ for similar object-viewer positions for three different mirrors: convex, plane and concave. The ratio of the angular image size for the curved mirror to the angular image size for a plane mirror (P, E and D being equal to their counterparts in both cases) is given by:

$$n = \frac{\theta}{\theta \text{ (plane)}} \simeq \frac{\tan \theta}{\tan \theta \text{ (plane)}} = \frac{D\left(P + E - \left(\frac{2PE}{R}\right)\right)}{D/(P + E)} \quad (3)$$

$$n = \frac{(P + E)}{\left(P + E - \frac{(2PE)}{R}\right)}$$

After rearranging, equation (3) may be written $$\frac{(n - 1)}{P} + \frac{(n - 1)}{E} = \frac{2n}{R} \quad\quad (4)$$

The ratio n is negative if the curved mirror inverts the image; otherwise it is positive.

As an example of equations (3) and (4), suppose a viewer wants to know how far to stand from a concave mirror in order to see an inverted image of himself that is half as big as the corresponding plane mirror image for the same viewing distance. Then, P = E = viewer and object distance
R = radius of concave mirror (positive)
$n = -\frac{1}{2}$ (half as big and inverted)

Inserting these parameters into equation (4) provides

P = E = 3R

Thus, if the radius of the concave mirror was one foot, the viewer would stand three feet away from it to see his inverted image half its true height.

Next we need to compare the angular magnification of the image in both horizontal and vertical directions. Equations (2) and (3) describe what happens in one direction, vertical or horizontal. With V standing for vertical and H for horizontal, the ratio of vertical image angle to horizontal image angle is given by:

$$M = \frac{\theta_V}{\theta_H} \simeq \frac{\tan (\theta_V)}{\tan (\theta_H)} = \frac{D/(P + E - (2PE/R_V))}{D/(P + E - (2PE/R_H))} = \quad (5)$$

$$M = \frac{(P + E - (2PE/R_H))}{(P + E - (2PE/R_V))}$$

The ratio M will be termed the elongation of the image. $R_H$ is the horizontal radius of curvature, and $R_V$ is the vertical radius of curvature. These radii need not be the same, either in magnitude or in direction (convex or concave).

If M is positive, then the mirror either inverts images both horizontally and vertically, or does not invert images in either of these directions. Thus, a positive value of M indicates a perverted mirror image. If the mirror inverts images in one direction but not the other, the image is non-perverted, and M is negative. Thus, a perverted image that is twice as tall as it is wide (compared to the object) would have M = +2. A non-perverted image that is half as tall as it is wide (again compared to the object) would have $M = -(\frac{1}{2})$. Equation (5) may be rearranged into the useful form:

$$\frac{(M-1)}{P} + \frac{(M-1)}{E} = 2\left(\frac{M}{R_V} - \frac{1}{R_H}\right) \quad (6)$$

This equation works for toroidal, cylindrical, spherical (concave and convex) and plane mirrors. For instance, the requirement that $M = +1$ (perverted, non-elongated images) causes several cancellations in equation 2B, with the result being $$R_V = R_H$$

This means that if the two curvatures are equal in magnitude and sign (i.e., both convex, both plane, or both concave), then a perverted, non-elongated image will be seen regardless of viewer and/or object positions.

In the case of the prior art concave-cylindrical mirror 10, when the curvature is horizontal (as in FIG. 1A), one may write
$R_H$ = concave radius = $R_E$ (positive)
$R_V$ = infinity (it is flat vertically). For someone viewing his own image (P = E), equation (6) becomes after a little algebra, $$\frac{(1-M)}{P} = \frac{1}{R_E} \text{ or } \quad (7)$$
$$M = 1 - \frac{P}{R_E}$$

This equation states that elongation in concave-cylindrical mirrors is directly proportional to viewer distance. A viewer at $P = 2(R_E)$ sees an image for which $M = 1$, which defines a non-perverted image as tall as it is wide in relationship to the object (the viewer).

A viewer at $P = 3(R_E)$ sees an image for which $M = -2$ (non-perverted, and twice as tall as wide); a viewer at $P = 4(R_E)$ sees an image for which $M = -3$ (non-perverted, and three times as tall as wide), and so forth. It is evident that elongation of the image reflected from concave-cylindrical mirror 10 increases as the viewer distance increases. The image elongation, is, of course, a major drawback in concave-cylindrical mirrors.

Figure 7:
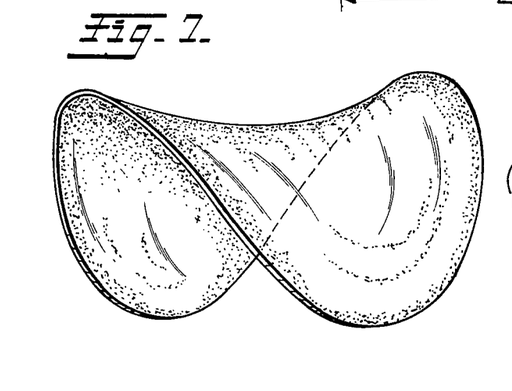
FIG. 7 shows a two nodal, saddle shaped surface in accordance with the invention.

The toroidal mirror 40 (FIG. 4) produces images smaller than those of the concave-cylindrical mirror. However, mirror 40 may be designed so that image elongation is very slight over a wide range of viewer distances. To show this, one uses equations (3), (4), (5) and (6), with $R_V = R_X$ = convex radius (negative) and $R_H = R_E$ = concave radius (positive). Such a mirror is shown in FIG. 7 wherein the saddle shape is defined by arcs which are catenaries (the shape of hanging chains) of equal magnitude but opposite direction. (Such a shape can be made with a soap solution and a wire frame for example.) Assume, for simplicity, that the viewer is looking at his own image, so that P = E. For the case of $R_E = R = -R_X$ (the concave radius is equal to the convex radius, both opposite in sign), equation (5) becomes $$M = \frac{1 - P/R}{1 + P/R}$$

For reasonable values of viewer distance (say, P = 5R) M is about $(-0.7)$, i.e., the image is non-perverted and seven tenths as tall as it is wide. As the viewer distance increases, M will approach minus one (non-perverted, and without elongation), but will not equal minus one until the viewer is at an infinite distance. For this reason, images viewed in mirrors such as the saddle mirror of FIG. 7, for which the convex radius is equal in magnitude to the concave radius, will appear slightly elongated in the direction of the concave curvature. However, the elongation found in mirrors of this type is considerably smaller than the elongation found in concave-cylindrical mirrors.

Toroidal mirror 40 may be designed so that the viewer sees non-elongated images through a specified range of distances from the mirror. For very close viewing distances, the image will be slightly wider than it is tall, and for more remote distances the image will be slightly taller than it is wide. Over a reasonable range of viewing distances close to the mirror, no elongation is apparent, and images appear much as they do in "real life". The first step in designing such toroidal mirrors is to decide what the magnification n is, relative to the image that would be formed in a plane mirror, by using $R_E$ as the radius R in equation (3). From experiment, it has been found that for someone viewing himself, a non-perverted, non-elongated image can be resolved when the viewer is at a distance equal to or greater than four times the concave radius of the mirror 40. Thus, setting $P = E = 4R_E$ in equation (3), one finds that $n = (-\frac{1}{3})$. This means the mirror must be designed so that at the normal viewing distance, the image will be less than or equal to one-third the size of the corresponding plane-mirror image. This represents a limitation on the toroidal mirror; a viewer closer than $4R_E$ will have trouble focusing on his image. However, for the concave-cylindrical mirror, the distance one must stand from the mirror in order to focus the image is more than ten times the concave radius, and at this distance the image is extremely elongated as well. Thus, although the toroidal mirror does not form perfect images, it is a vest improvement over the prior art concave-cylindrical mirror.

One mirror of the type of the instant invention which produces a non-perverted, non-elongated image for a viewer at 18 inches from the mirror, and which produces easily resolvable images, is described by:
$R_E$ = 2.52 inches = (0.14) times the viewer distance; Less than one-fourth, as required;
$R_X$ = $-3.50$ inches;
$h$ = 1.50 inches
$R_E/\sqrt{2}$ = 1.78 inches.

The value of h is less than that of $R_E/\sqrt{2}$, so there will be no double reflections. The elongation M changes when the viewer moves toward and away from the torodial mirror, starting from the original position (P = E = 18 inches). Equation (6) simplifies to:

$$M = \frac{1 - P/R_E}{1 - P/R_X} = \frac{1 - P/2.52''}{1 + P/3.50''} \text{ for } \frac{R_E = 2.52'' \text{ and}}{R_X = 3.50''}$$

when P = 12 inches, M = $(-0.85)$.
when P = 18 inches, M = $(-1.00)$ (no elongation) and
when P = 24 inches, M = $(-1.08)$.

It is evident that the change in elongation is minimal for a reasonable range of viewing positions with the toroidal mirror.

Figure 8A:
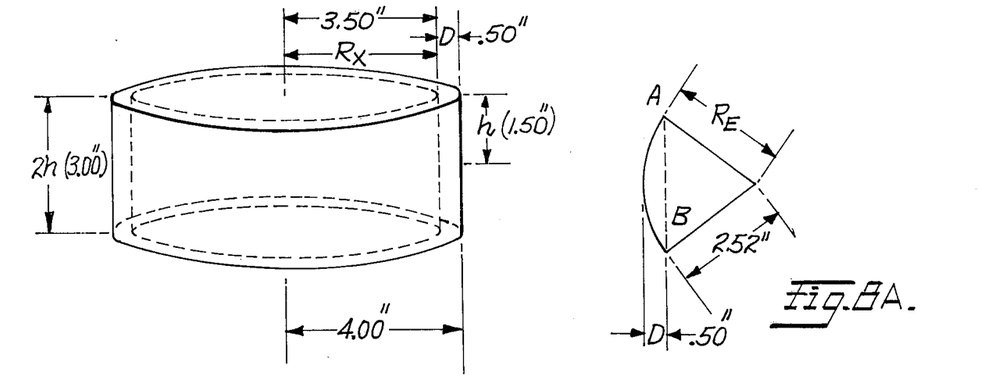
FIGS. 8A–8C are perspective drawings of one embodiment of the invention showing a method of making thereof.
Figure 8B:
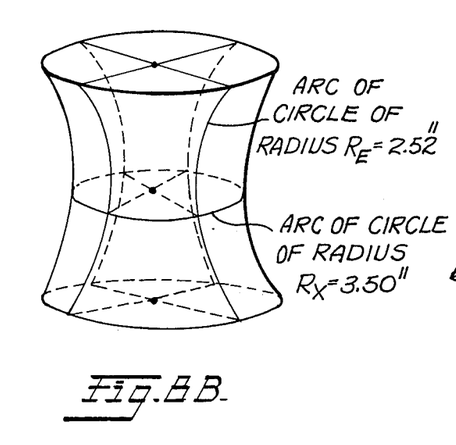
Figure 8C:
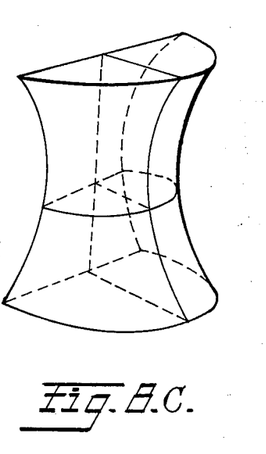

Mirror 40 is formed from a section of torus. In essence, a non-perverting mirror in accordance with the invention has spacially coincident concave and convex curvatures (compound curvatures). A non-perverting mirror may thus be fabricated as illustrated in FIGS. 8A–8C. The concave and convex radii $R_E$ and $R_X$ are those taken from the example above. FIG. 8A shows a cylinder 50 having a half-diameter of 4.0 inches ($R_X$ = 3.5 inches and D = 0.5 inches). The cylinder is cut as shown on the right in FIG. 8A with a cutting radius $R_E$ = 2.52 inches. Arc A–B indicates the cutting radius. After cutting (using a lathe, for example), one obtains the shape as shown in FIG. 8B. FIG. 8B may be cut in half (vertically through the middle) to obtain the mirror surface of FIG. 8C. The cylinder may be of a highly reflecting surface which may be polished to provide the desired non-perverting mirror or may be silver coated to achieve a high degree of reflectivity. Additionally, other methods of fabricating such non-perverting mirrors are readily apparent such as molding and stamping techniques.

When the compound curvature mirror or concave-cylindrical mirror is rotated by 90°, the image rotates a full 180° in the same direction. On the other hand, when the mirror remains stationary and an object is rotated 360° around the mirror in a clockwise direction, the image rotates 360° in a counterclockwise direction.

Figure 9A:
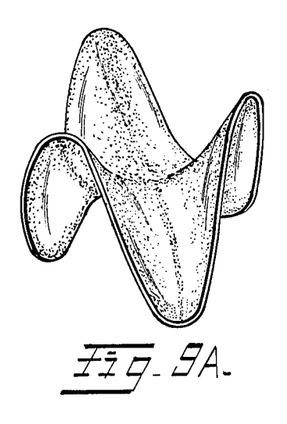
FIGS. 9A–9D are diagramatic representations of a three nodal embodiment of the invention.

A whole series of mirrors obey similar rotation laws to the compound curvature (such as toroidal) mirror. The monkey saddle surface, shown in FIG. 9A and heretofor a mere mathematical curiosity as regards its shape, has interesting image rotation properties when made with a reflecting surface to form a mirror.

Figure 9B:
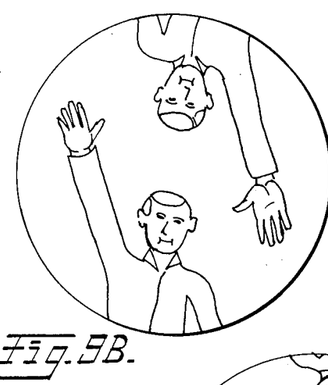
Figure 9C:
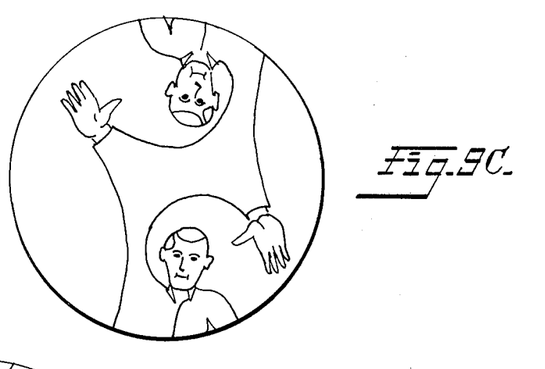
Figure 9D:
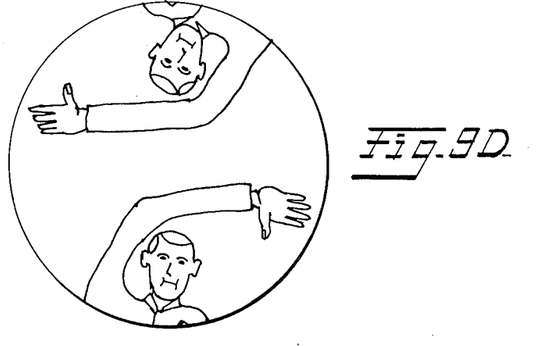

This surface has an isolated parabolic point surrounded by a region of negative curvature, which indicates a small, relatively flat central area which grades continuously into three sets of hills and valleys characterized by orthogonal convex and concave curvatures. A reflecting surface as in FIG. 9A produces two non-perverted images of a given object. The complete image is continuous everywhere except on the small, relatively flat area at the mirror's center. One image of a viewer's body can exchange hands with the other image of the viewer's body, as shown diagramatically in FIGS. 9B, 9C and 9D. These figures show that an object must go through two revolutions (720°) around the stationary mirror in order to rotate the image through one revolution (360°) in the opposite direction. As well, a rotation of the mirror by 120° rotates the image of a stationary object through 180° in the same direction.

Figure 10:
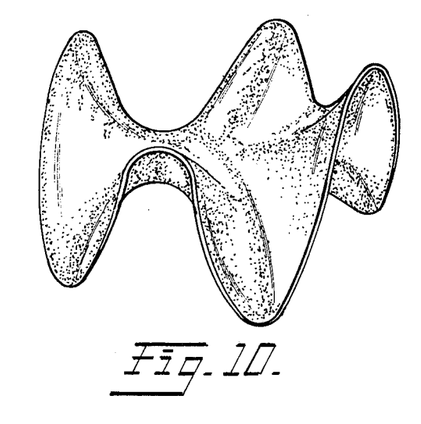
FIG. 10 is a diagramatic representation of a four nodal embodiment of the invention.

A surface with four sets of hills and valleys (four "nodes") produces three non-perverted images. Such a surface is shown in FIG. 10. A rotation of this "nodal" mirror by 135° rotates the images by 180°. When the mirror is stationary, three revolutions of the object around the mirror are required for one revolution of the image.

In general, if the surface has m nodes, there will be (m − 1) non-perverted images. To produce an image rotation of X degrees in a particular direction, the mirror must be rotated through $$\left( \frac{(m-1)}{m} (X) \right)$$

degrees in the same direction.

When the mirror is stationary, an image rotation of Y degrees in one direction is caused by a rotation of the object by (m − 1)Y degrees in the opposite direction.

For a two-node mirror (see FIG. 7), m is 2. Thus the number of images will be (m − 1) = 2 − 1 = 1. To rotate the image through 180°, the mirror must be rotated through $$\left( \frac{(m-1)}{m} (X) \right) = \left( \frac{(2-1)}{2} \right)(180 \text{ degrees}) = 90 \text{ degrees}$$

And to rotate the image through 360° when the mirror is stationary, the object must be rotated through $$(m - 1)(y) = (2 - 1)(360°) = 360°.$$

The toroidal mirror 40 of FIG. 4 as well as the compound mirrors shown in FIG. 8C are both essentially two-nodal mirrors in that they have a single pair of intersecting convex and concave surface regions.

Figure 11:
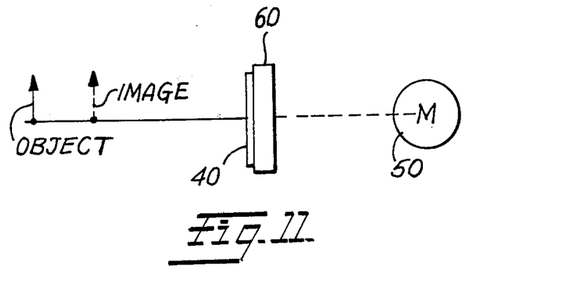
FIG. 11 is a diagram of apparatus for rotating the non-perverting mirrors of the invention.

FIG. 11 shows a means for rotating mirrors such as any of the non-perverting mirrors of the invention. Motor 50 is connected to a holding means 60 to rotate same. The mechanical connection between motor 50 and holding means 60 is indicated by a dotted line. Holding means 60 has secured thereto (via adhesive means for example) a non-perverting compound curvature mirror (such as mirror 40) in accordance with the invention. Image and object arrows are depicted, and it is apparent that upon rotation of the holding means 60 and mirror the image will rotate in accordance with the rotation laws set forth herein.

The two-nodal mirror of FIG. 7 is simply a special case ($R_E = R_X$) of the toroidal mirror 40 of FIGS. 4 and 8C.

Although the invention has been described with particular reference to the preferred embodiment, it is understood that certain modifications and improvements may be evident to those skilled in the art and the invention is intended to cover all modifications which do not depart from the spirit and scope of the invention.

I claim:

1. A mirror for providing a non-perverted visual image of an object comprising a light reflecting surface for reflecting visible light and having at least one intersecting concave and convex region substantially forming a continuous, unitary surface, said intersecting concave and convex region substantially forming a section of a toroid.

2. A mirror as recited in claim 1 wherein said section of a toroid is a section facing toward the center of said toroid.

3. A mirror as recited in claim 2 wherein said toroid is a torus.

4. A mirror as recited in claim 3 wherein said intersecting concave and convex regions are generally orthogonal to one another.

5. A mirror as recited in claim 1 wherein said intersecting concave and convex regions intersect substantially at right angles to one another.

6. A mirror as recited in claim 1 wherein said concave region has a radius of curvatures $R_E$ and said convex region has a radius of curvature $R_X$ and $R_X \geq R_E$.

7. A mirror as recited in claim 6 wherein $R_X > R_E$.

8. A mirror as recited in claim 1 wherein said mirror has a plurality of spacially coincident concave and convex curvatures.

9. A mirror as recited in claim 8 wherein said mirror is in the form of a monkey saddle.

10. A method of forming a non-perverted visual image of an object comprising the steps of:
(a) reflecting a visible light incident wavefront from a surface having a concave region, and
(b) simultaneously reflecting said visible light incident wavefront from a convex surface region coincident with said concave region, said convex and concave region substantially forming a section of a toroid.

11. Apparatus for forming non-perverted visual images and rotating same comprising:
(a) a visible light reflecting surface having spacially coincident concave and convex curvatures, and
(b) means for rotating said reflecting surface whereby said non-perverted image is formed and rotated.

12. Apparatus as recited in claim 11 wherein said reflecting surface is an integral, continuous surface.

13. Apparatus as recited in claim 12 wherein said reflecting surface has $m$ nodes where $m$ is an integer.

14. Apparatus as recited in claim 12 wherein said mirror rotates by an amount $(m - 1/m) X$ to produce a rotation of said non-perverted image by an amount $X$.

15. A mirror for providing a non-perverted visual image of an object comprising a light reflecting surface for reflecting visible light wherein said reflecting surface has $m$ nodes wherein each node corresponds to an intersecting concave and convex region and wherein $m$ is an integer greater than 2.

16. A mirror as recited in claim 15 wherein said intersecting concave and convex regions form sections of a toroid.

17. A mirror as recited in claim 16 wherein said toroid is a torus.

18. A mirror as recited in claim 17 wherein said concave region has a radius of curvature $R_E$ and said convex region has a radius of curvature $R_X$ and $R_X$ is greater than or equal to $R_E$.

19. A device for providing a non-perverted, non-distorted visual image of an object comprising:
(a) a mirror surface for reflecting visible light,
(b) said surface having at least one intersecting concave and convex region,
(c) said intersecting concave and convex regions disposed generally othogonal to one another and substantially forming part of a toroid,
(d) said concave region of said mirror surface reflecting a non-perverted visual image of the object, and
(e) said convex region of said mirror surface compensating for distortions in said reflected non-perverted image,
whereby said mirror surface reflects a non-perverted, non-distorted image of said object.

20. A device as recited in claim 19 wherein said toroid is a torus.

* * * * *